US012767236B2

(12) United States Patent
Lee et al.

(10) Patent No.: US 12,767,236 B2
(45) Date of Patent: Oct. 20, 2026

(54) REAR FRAME FOR VEHICLE

(71) Applicants: Hyundai Motor Company, Seoul (KR); Kia Corporation, Seoul (KR)

(72) Inventors: Sun Ju Lee, Incheon (KR); Il Do Kim, Suwon-si (KR); Ji Woong Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 142 days.

(21) Appl. No.: 18/760,402

(22) Filed: Jul. 1, 2024

(65) Prior Publication Data

US 2025/0196931 A1 Jun. 19, 2025

(30) Foreign Application Priority Data

Dec. 13, 2023 (KR) ........................ 10-2023-0181216

(51) Int. Cl.
*B62D 25/08* (2006.01)

(52) U.S. Cl.
CPC .................................. *B62D 25/088* (2013.01)

(58) Field of Classification Search
CPC .... B60Y 2306/01; B62D 21/02; B62D 21/09; B62D 21/11; B62D 21/152; B62D 25/08; B62D 25/087; B62D 25/088; B62D 25/163; B62D 25/2027
See application file for complete search history.

(56) References Cited

U.S. PATENT DOCUMENTS

| | | | | |
|---|---|---|---|---|
| 8,973,980 | B2 | 3/2015 | Mildner et al. | |
| 10,562,569 | B2 * | 2/2020 | Tanaka | B60K 17/16 |
| 10,745,051 | B2 * | 8/2020 | Tanaka | B62D 21/11 |
| 11,220,292 | B2 | 1/2022 | Watanabe et al. | |
| 11,407,452 | B2 | 8/2022 | Murata et al. | |
| 11,459,035 | B1 | 10/2022 | Hennessey et al. | |
| 11,679,813 | B2 | 6/2023 | Watanabe | |
| 12,497,104 | B2 | 12/2025 | Kim et al. | |
| 12,509,161 | B2 | 12/2025 | Park et al. | |
| 2011/0156447 | A1 * | 6/2011 | Matsuoka | B62D 25/088 296/203.04 |
| 2021/0371011 | A1 | 12/2021 | Itoh et al. | |

(Continued)

FOREIGN PATENT DOCUMENTS

| | | | |
|---|---|---|---|
| CN | 111032493 A | * | 4/2020 |
| JP | 2000289645 A | | 10/2000 |

(Continued)

*Primary Examiner* — Lori Lyjak
(74) *Attorney, Agent, or Firm* — Slater Matsil, LLP

(57) ABSTRACT

An embodiment rear frame includes a pair of side portions spaced apart from each other in a width direction of a vehicle, a first cross portion connecting front portions of the side portions, and a second cross portion connecting rear portions of the side portions, wherein the side portions and the first and second cross portions together are a unitary one-piece structure, and wherein each side portion includes a front mounting surface on which a front mount of a rear subframe is mounted, a front recessed structure on the front mounting surface, a rear mounting surface on which a rear mount of the rear subframe is mounted, and a rear recessed structure on the rear mounting surface, the front and rear recessed structures each having a pocket shape with an open top and a through hole.

20 Claims, 15 Drawing Sheets

(56) References Cited

U.S. PATENT DOCUMENTS

| | | | |
|---|---|---|---|
| 2022/0332371 | A1 | 10/2022 | Sotty et al. |
| 2023/0311995 | A1 | 10/2023 | Akaba et al. |
| 2023/0373563 | A1 | 11/2023 | Rai et al. |
| 2024/0092430 | A1 | 3/2024 | Anasenzl et al. |
| 2025/0121885 | A1 | 4/2025 | Tani |

FOREIGN PATENT DOCUMENTS

| | | | |
|---|---|---|---|
| JP | 6487977 | B2 * | 3/2019 |
| JP | 2021142763 | A | 9/2021 |
| JP | 2022043911 | A | 3/2022 |
| JP | 2023053481 | A | 4/2023 |
| KR | 20210142910 | A | 11/2021 |
| WO | 2022031991 | A1 | 2/2022 |
| WO | 2022223204 | A1 | 10/2022 |
| WO | 2023016106 | A1 | 2/2023 |

* cited by examiner

REAR FRAME FOR VEHICLE

CROSS-REFERENCE TO RELATED APPLICATIONS

This application claims the benefit of Korean Patent Application No. 10-2023-0181216, filed on Dec. 13, 2023, which application is hereby incorporated herein by reference in its entirety.

TECHNICAL FIELD

The present disclosure relates to a rear frame for a vehicle.

BACKGROUND

As the perception of environmental crisis and depletion of oil resources has increased, eco-friendly vehicles including electric vehicles and hybrid electric vehicles have recently risen to prominence.

Since the electric vehicle has a relatively heavy battery and a power electronics (PE) module, the weight thereof relatively increases. Accordingly, impact energy increases in the event of a collision/impact of the vehicle, while an impact energy absorption space is relatively reduced. In order to solve these problems, the electric vehicle may need to increase stiffness of a vehicle body by integrating structures for load path connection and reduce costs and simplify an assembly structure by reducing the number of parts/components.

The electric vehicle may use a rear frame on the rear of the vehicle body in order to achieve weight reduction and improved stiffness, and the rear frame may be an essential part for crashworthiness and NVH performance. The rear frame may include a pair of rear side members and a plurality of crossmembers connecting the pair of rear side members.

In the rear frame of the electric vehicle according to the related art, however, the rear side members and the crossmembers may be joined through mechanical fasteners such as self-piercing rivet (SPR) and flow drill screw (FDS), resulting in loss of stiffness of a vehicle rear structure.

In addition, the rear side members and the crossmembers of the related art rear frame may have closed cross sections by a pressing method, a joining method, and the like so that they may meet target stiffness. However, as the plurality of components are manufactured by pressing and are joined using fasteners, welding, and/or the like, a manufacturing process of the rear side members and the crossmembers may become very complex, and the manufacturing cost thereof may relatively increase.

Accordingly, the rear frame may be manufactured by a casting method such as a high-vacuum die casting method, which reduces the number of parts/components and the manufacturing cost of the rear frame and is advantageous for the integration of the vehicle body parts/components. However, when the rear frame is manufactured by the casting method, it may have a pocket structure with an open top, and an electrodeposition coating solution may be stagnated in the pocket structure during electrodeposition coating so that the electrodeposition coating solution remaining in the pocket structure may be burned during baking in the electrodeposition coating process.

The above information described in this background section is provided to assist in understanding the background of the inventive concept, and it may include any technical concept which is not considered as the already known prior art.

SUMMARY

The present disclosure relates to a rear frame for a vehicle. Particular embodiments relate to a rear frame designed to be easily manufactured by a casting method and to prevent stagnation of an electrodeposition coating solution.

Embodiments of the present disclosure can solve problems occurring in the prior art while advantages achieved by the prior art are maintained intact.

An embodiment of the present disclosure provides a rear frame for a vehicle designed to be easily manufactured by a casting method and to prevent stagnation of an electrodeposition coating solution.

According to an embodiment of the present disclosure, a rear frame may include a pair of side portions spaced apart from each other in a width direction of a vehicle, a first cross portion connecting front portions of the pair of side portions, and a second cross portion connecting rear portions of the pair of side portions. The pair of side portions, the first cross portion, and the second cross portion may form a unitary one-piece structure. Each side portion may include a front mounting surface on which a front mount of a rear subframe is mounted, a front recessed structure which is formed on the front mounting surface, a rear mounting surface on which a rear mount of the rear subframe is mounted, and a rear recessed structure which is formed on the rear mounting surface. The front recessed structure may have a pocket shape with an open top, and the front recessed structure may have a through hole. The rear recessed structure may have a pocket shape with an open top, and the rear recessed structure may have a through hole.

Each side portion may include a channel portion to which a wheel house inner panel and a wheel house reinforcing member are fixed, the channel portion may have a pocket shape with an open top, and the channel portion may have a through hole.

Each side portion may further include a damper receptacle in which a suspension damper is mounted, and the damper receptacle may have a pocket shape having a cavity with an open bottom.

The damper receptacle may be located between the front mounting surface and the rear mounting surface.

Each side portion may include a front inboard wall extending from the damper receptacle toward the front of the vehicle and a rear inboard wall extending from the damper receptacle toward the rear of the vehicle. The front inboard wall and the rear inboard wall may extend along a center line between an inboard edge of the side portion and an outboard edge of the side portion.

The front mounting surface may be formed at a bottom edge of the front inboard wall, and the rear mounting surface may be formed at a bottom edge of the rear inboard wall.

The front recessed structure may be defined by the front inboard wall and the front mounting surface, and the front recessed structure may have a reinforcing rib extending from the front inboard wall toward the interior of the vehicle.

The rear recessed structure may be defined by the rear inboard wall and the rear mounting surface, and the rear recessed structure may have a reinforcing rib extending from the rear inboard wall toward the interior of the vehicle.

The first cross portion may include a top wall, a vertical wall which extends vertically downward from the top wall, a bottom wall which extends from a bottom edge of the vertical wall toward the front of the vehicle, a recessed wall which is recessed from the bottom wall toward the bottom of the vehicle, a plurality of raised walls which are raised upward from the recessed wall, and a plurality of passages which are formed between the plurality of raised walls, and the plurality of passages may be flush with a top surface of the recessed wall.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
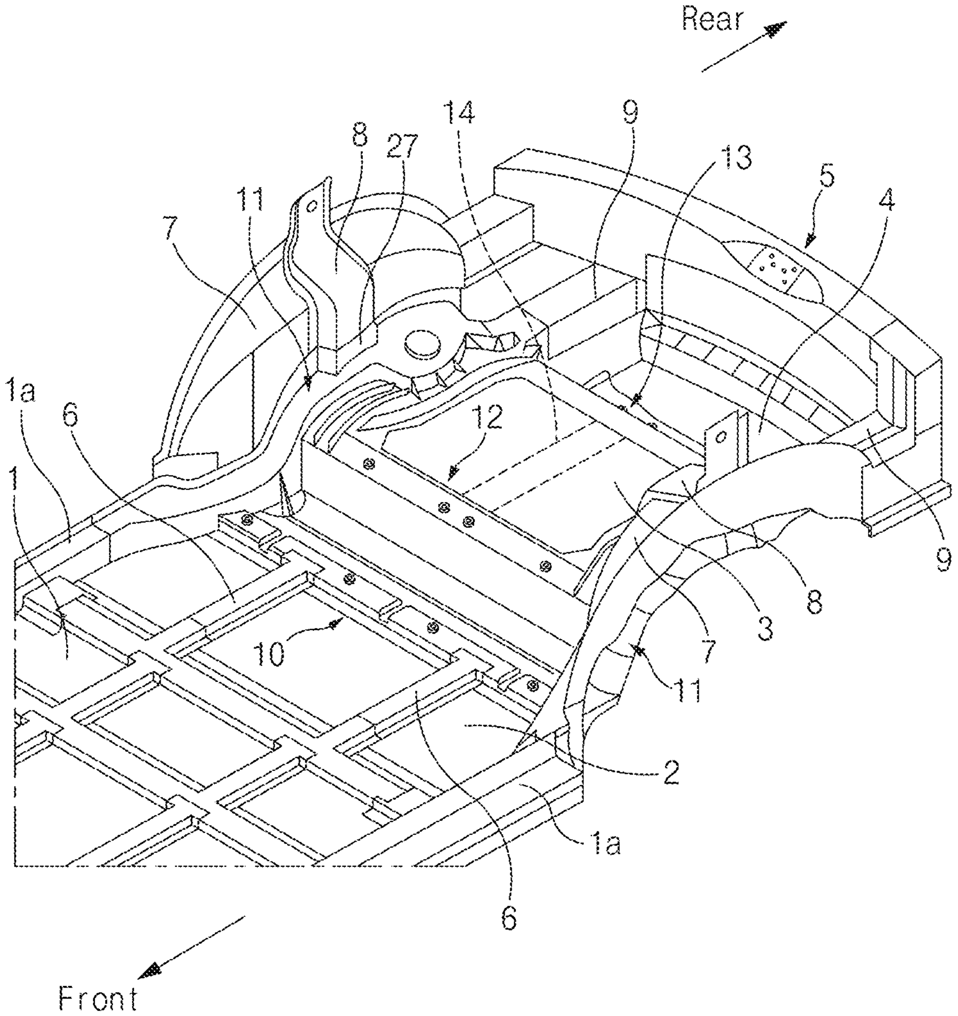
FIG. 1 illustrates a perspective view of a rear frame for a vehicle according to an exemplary embodiment of the present disclosure which is mounted on a vehicle rear structure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence, order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art and are not to be interpreted as having ideal or excessively formal meanings unless clearly defined as having such in the present application.

Referring to FIG. 1, a rear frame 10 for a vehicle according to an exemplary embodiment of the present disclosure may include a pair of side portions 11 spaced apart from each other in a width direction of the vehicle, a first cross portion 12 connecting front portions of the pair of side portions 11, and a second cross portion 13 connecting rear portions of the pair of side portions 11. The pair of side portions 11, the first cross portion 12, and the second cross portion 13 may form a unitary one-piece structure by a casting method. In a rear frame according to the related art, a pair of rear side members, a first crossmember, and a second crossmember may be individually manufactured, and then the pair of rear side members, the first crossmember, and the second crossmember may be joined using various fasteners. On the other hand, according to an exemplary embodiment of the present disclosure, the pair of side portions 11, the first cross portion 12, and the second cross portion 13 may form a unitary one-piece structure so that there may be no joints made by welding, fasteners, brackets, reinforcements, etc. Accordingly, a load may be uniformly distributed or transferred through the pair of side portions and the plurality of cross portions. According to the related art, as fractures or damage occur at joints between the rear side members and the crossmembers, stiffness of the rear frame may be reduced. On the other hand, since the rear frame 10 according to an exemplary embodiment of the present disclosure has no joints between each side portion 11 and the cross portions 12 and 13, a decrease in stiffness at the joints of the rear frame 10 may be prevented. Not only mounting stiffness of related components connected to the rear frame 10 and stiffness thereof at mounting points but also rear crashworthiness (strength to withstand a rear crash or impact) may be significantly improved.

The rear frame 10 may be connected to a rear edge of a center floor 1 of the vehicle and a pair of side sills 1*a* may be mounted at both side edges of the center floor 1. A plurality of rear floor panels 2, 3, and 4 may be mounted on the rear frame 10. The plurality of rear floor panels 2, 3, and 4 may include a first rear floor panel 2 connected to the rear edge of the center floor 1, a second rear floor panel 3 located behind the first rear floor panel 2, and a storage well 4 located behind the second rear floor panel 3.

A front edge of the first rear floor panel 2 may be fixed to the rear edge of the center floor 1 using fasteners, welding, and/or the like. A plurality of longitudinal members 6 may be fixed to the first rear floor panel 2 using fasteners, welding, and/or the like, and a rear end of each longitudinal member 6 may be fixed to the first cross portion 12 using fasteners, welding, and/or the like. A rear edge of the first rear floor panel 2 may be fixed to a front edge of the first cross portion 12 using fasteners, welding, and/or the like.

The second rear floor panel 3 may be mounted between the pair of side portions 11, the first cross portion 12, and the second cross portion 13. The second rear floor panel 3 may be located higher than the first rear floor panel 2. A front edge of the second rear floor panel 3 may be fixed to the first cross portion 12 using fasteners, welding, and/or the like, and a rear edge of the second rear floor panel 3 may be fixed to the second cross portion 13 using fasteners, welding, and/or the like. Each side edge of the second rear floor panel 3 may be fixed to the corresponding side portion 11 using fasteners, welding, and/or the like.

Referring to FIG. 1, the rear frame 10 according to an exemplary embodiment of the present disclosure may further include a support member 14 extending along a longitudinal direction of the vehicle between the first cross portion 12 and the second cross portion 13. A front end of the support member 14 may be fixed to a middle portion of the first cross portion 12, and a rear end of the support member 14 may be fixed to a middle portion of the second cross portion 13. Accordingly, the support member 14 may connect the first cross portion 12 and the second cross portion 13 in the longitudinal direction of the vehicle, thereby significantly improving longitudinal stiffness of the rear frame 10. In addition, the support member 14 may be mounted transverse to the first cross portion 12 and the second cross portion 13 so that the support member 14 may firmly support the second rear floor panel 3.

The storage well 4 may be recessed downward with respect to the second rear floor panel 3, and a front edge of the storage well 4 may be fixed to the second cross portion 13 using fasteners, welding, and/or the like. A pair of rear extension members 9 may be fixed to both side edges of the storage well 4 using fasteners, welding, and/or the like. A back panel 5 may be fixed to a rear edge of the storage well 4 using fasteners, welding, and/or the like.

A pair of wheel house inner panels 7 may be mounted on the pair of side portions 11, respectively. Each wheel house inner panel 7 may be fixed to the corresponding side portion 11 using fasteners, welding, and/or the like.

Figure 2:
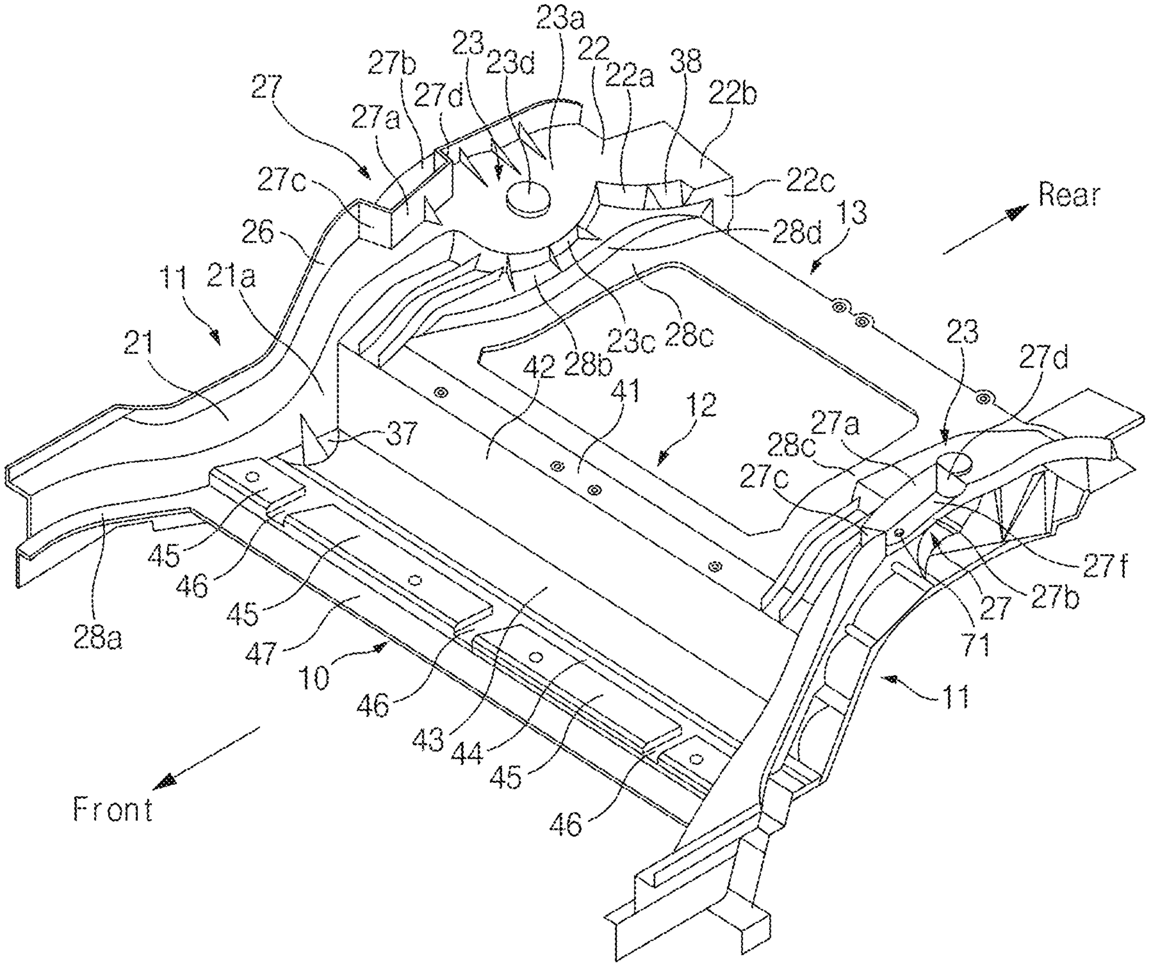
FIG. 2 illustrates a perspective view of a rear frame for a vehicle according to an exemplary embodiment of the present disclosure.

Referring to FIG. 2, the pair of side portions 11 may be spaced apart from each other in the width direction of the vehicle. Each side portion 11 may extend in the longitudinal direction of the vehicle so that the side portions 11 may define both side edges of a vehicle rear structure.

Each side portion 11 may include a damper receptacle 23 in which a suspension damper 16 is mounted, a front top wall 21 extending from the damper receptacle 23 toward the front of the vehicle, and a rear top wall 22 extending from the damper receptacle 23 toward the rear of the vehicle. A front end of the side portion 11 may be connected to the corresponding side sill 1*a*, and a rear end of the side portion 11 may be connected to the corresponding rear extension member 9.

Figure 4:
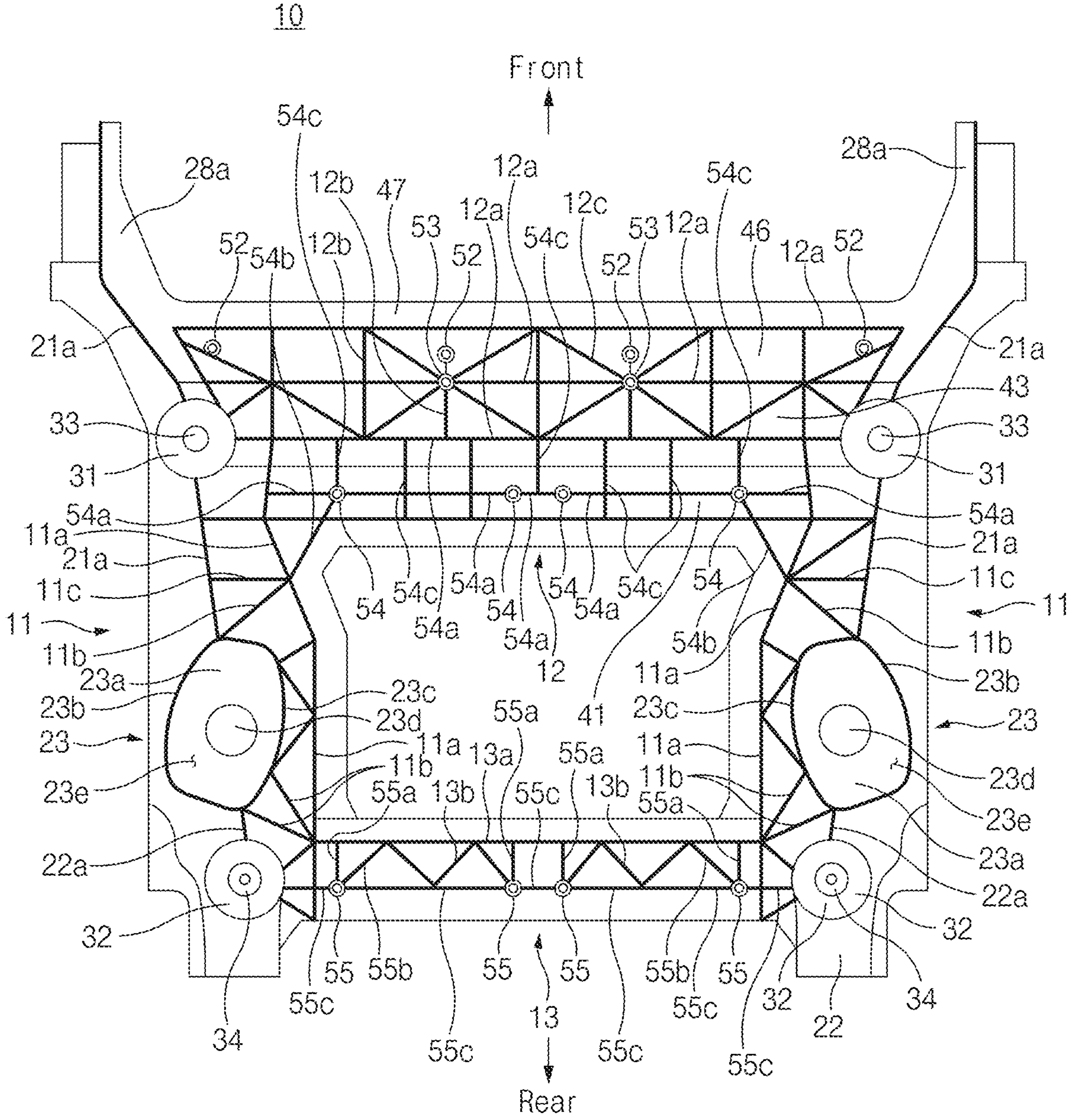
FIG. 4 illustrates a bottom view of a rear frame for a vehicle according to an exemplary embodiment of the present disclosure.
Figure 10:
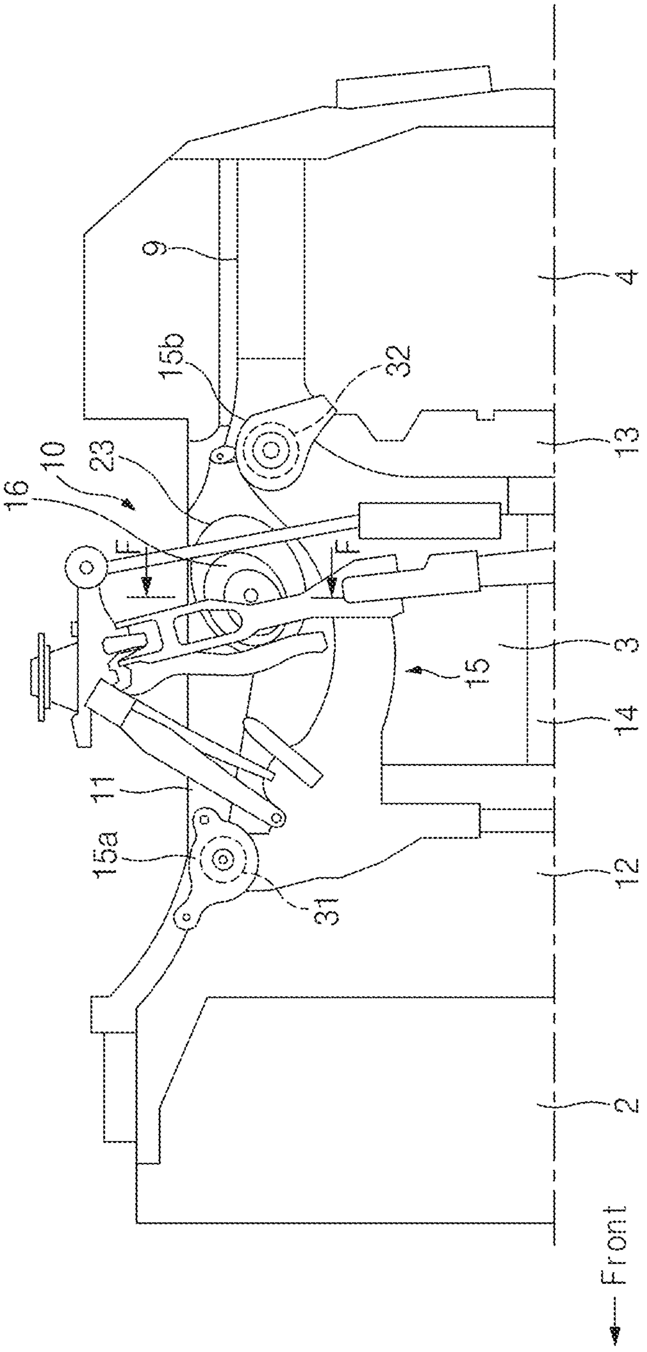
FIG. 10 illustrates a bottom view of a state in which a rear subframe is mounted on a side portion of a rear frame for a vehicle according to an exemplary embodiment of the present disclosure.
Figure 11:
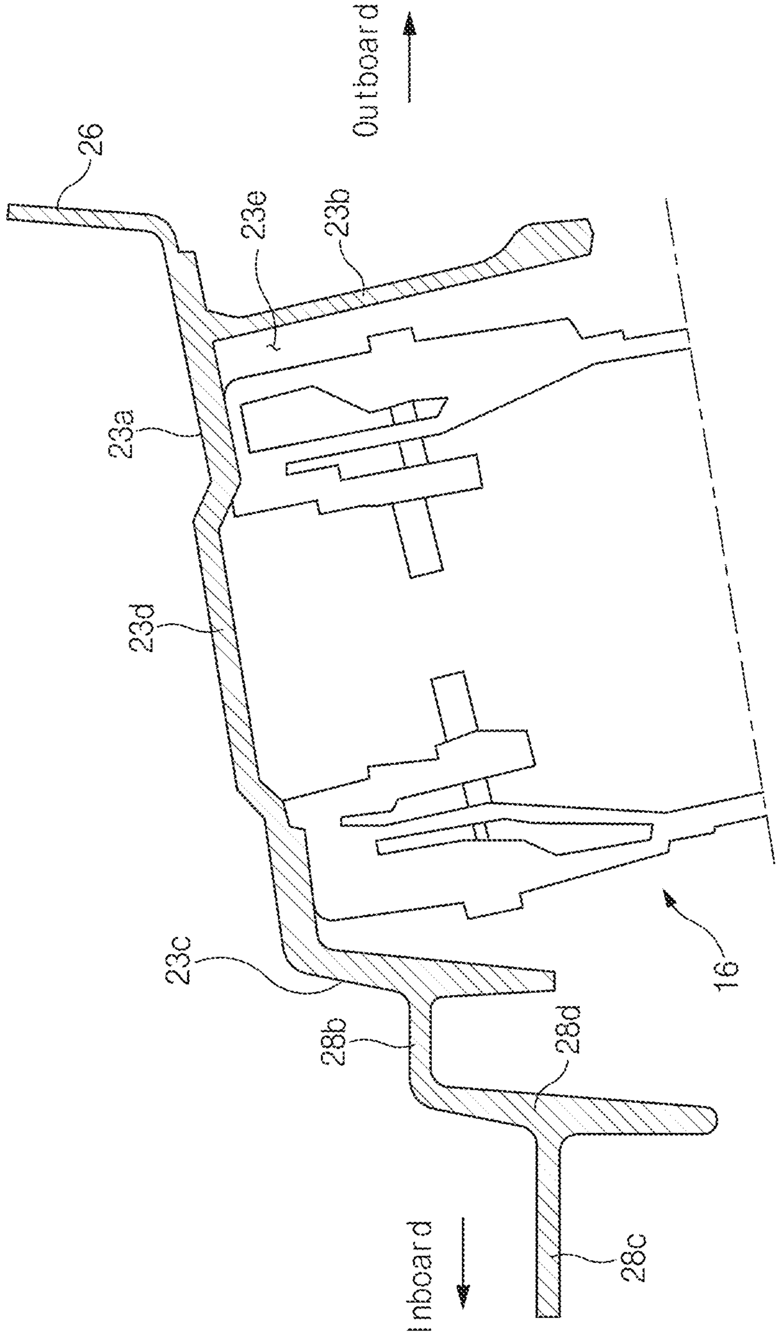
FIG. 11 illustrates a cross-sectional view taken along line F-F of FIG. 10.

Referring to FIGS. 4, 10, and 11, the damper receptacle 23 may have a pocket shape having a cavity 23*e* with an open bottom. An upper portion of the suspension damper 16 such as a shock absorber may be received in the cavity 23*e* of the damper receptacle 23, and the upper portion of the suspension damper 16 may be mounted in the cavity 23*e* of the damper receptacle 23. The damper receptacle 23 may include a top wall 23*a*, an outboard wall 23*b* extending downward from an outboard edge of the top wall 23*a*, and an inboard wall 23*c* extending downward from an inboard edge of the top wall 23*a*. The cavity 23*e* may be defined by the top wall 23*a*, the outboard wall 23*b*, and the inboard wall 23*c*. A front end of the outboard wall 23*b* may be connected to a front end of the inboard wall 23*c*, and a rear end of the outboard wall 23*b* may be connected to a rear end of the inboard wall 23*c*. The damper receptacle 23 may further include a raised wall 23*d* which is raised upward from the top wall 23*a*.

A front end of the front top wall 21 may be connected to the corresponding side sill 1*a*, and a rear end of the front top wall 21 may be integrally connected to a front end of the damper receptacle 23.

Figure 7:
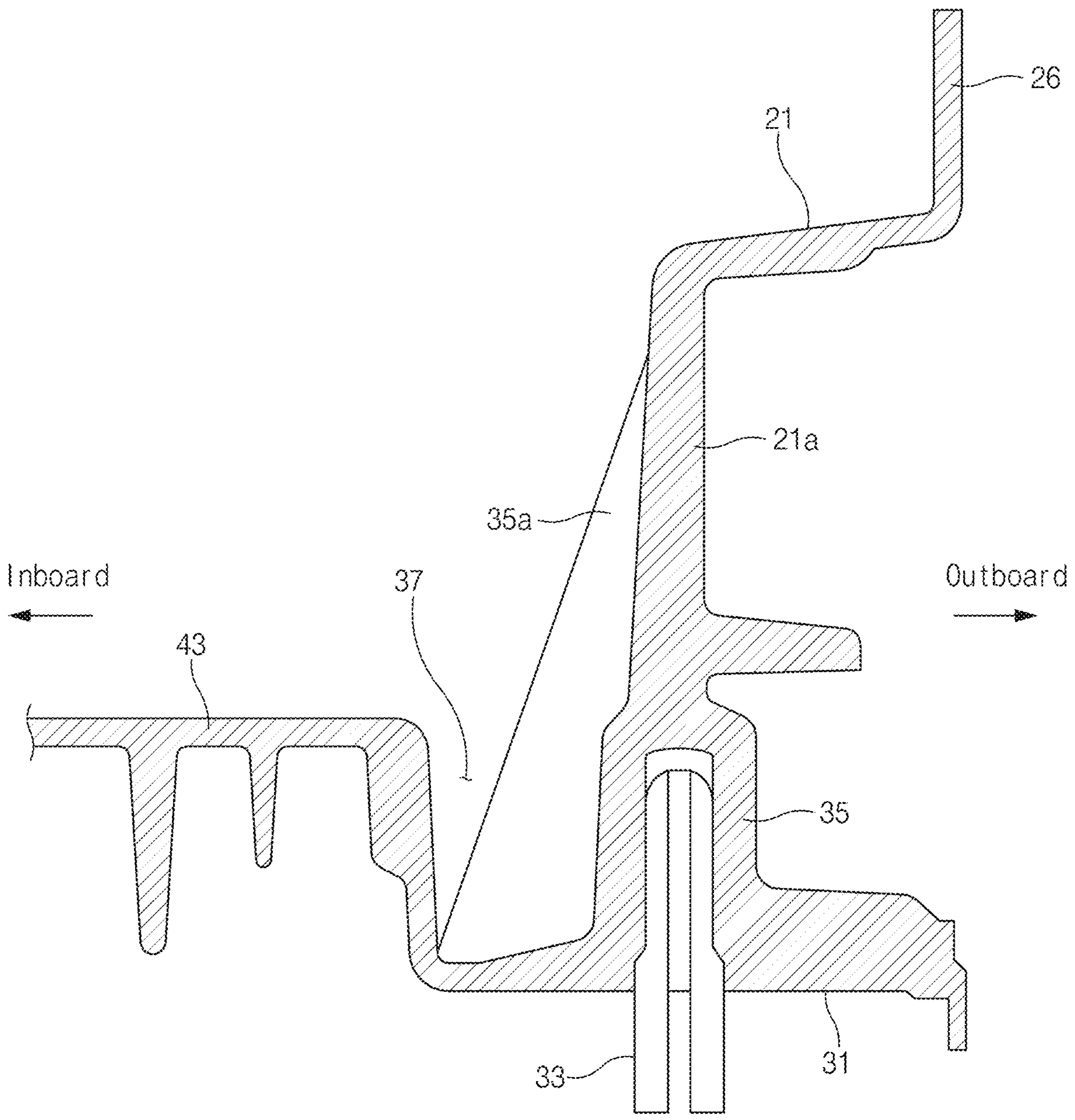
FIG. 7 illustrates a cross-sectional view taken along line C-C of FIG. 5.

Referring to FIG. 7, a front inboard wall 21*a* may be a vertical wall extending vertically downward from the front top wall 21, and the front inboard wall 21*a* may face the interior of the vehicle. The front inboard wall 21*a* may extend along a center line between an outboard edge of the side portion 11 and an inboard edge of the side portion 11. In particular, the front inboard wall 21*a* may extend along a center line of the damper receptacle 23.

A front end of the rear top wall 22 may be integrally connected to a rear end of the damper receptacle 23. A rear end of the rear top wall 22 may be integrally connected to a front end of the corresponding rear extension member 9. The rear top wall 22 may have a rear portion 22*b* receiving a front portion of the rear extension member 9 and an inboard wall 22*c*.

Figure 8:
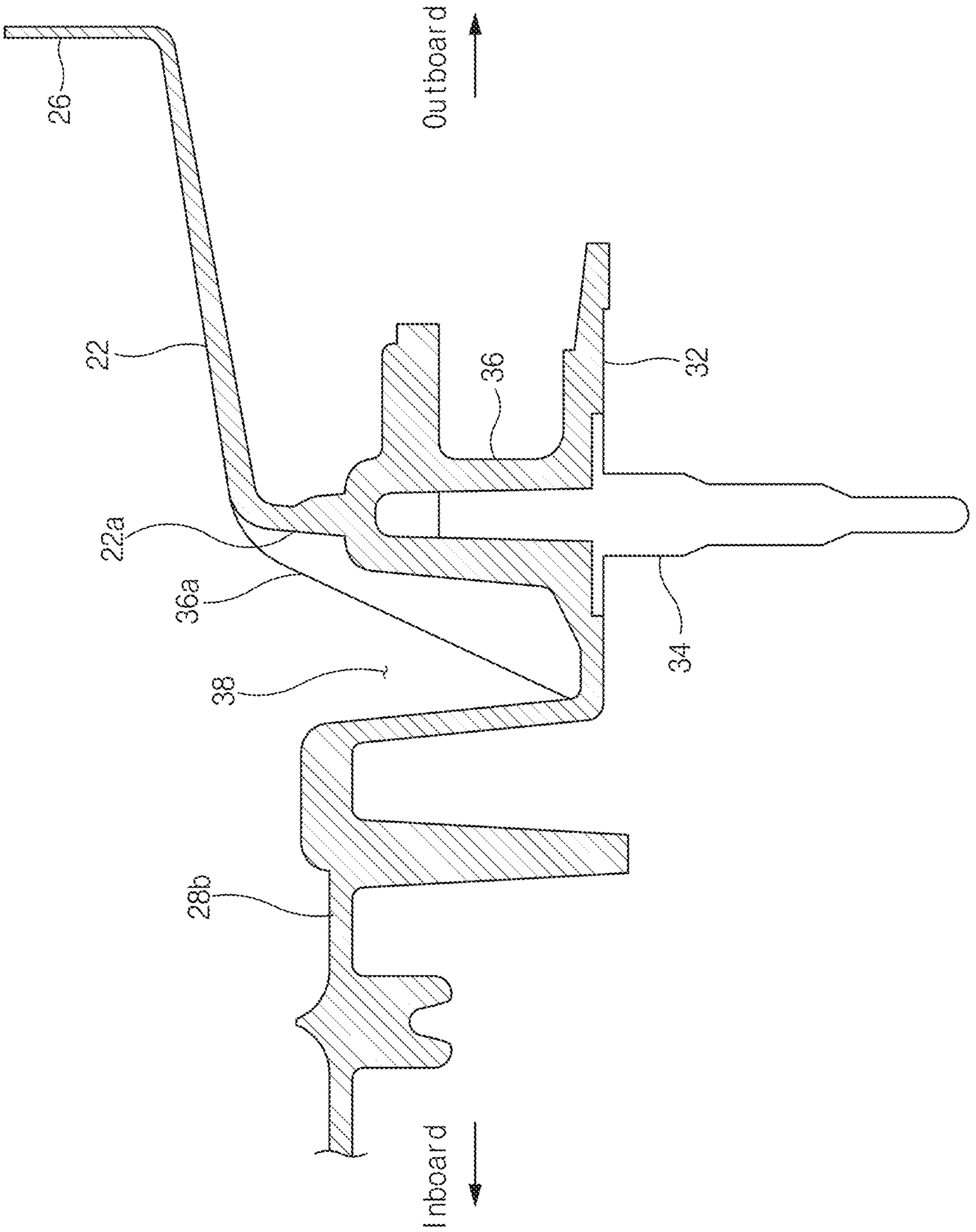
FIG. 8 illustrates a cross-sectional view taken along line D-D of FIG. 5.

Referring to FIG. 8, a rear inboard wall 22*a* may be a vertical wall extending vertically downward from the rear top wall 22, and the rear inboard wall 22*a* may face the interior of the vehicle. The rear inboard wall 22*a* may extend along the center line between the outboard edge of the side portion 11 and the inboard edge of the side portion 11. In particular, the rear inboard wall 22*a* may extend along the center line of the damper receptacle 23.

As described above, the front inboard wall 21*a* may extend from the damper receptacle 23 toward the front of the vehicle, the rear inboard wall 22*a* may extend from the damper receptacle 23 toward the rear of the vehicle, and the front inboard wall 21*a* and the rear inboard wall 22*a* may be integrally connected to the damper receptacle 23 so that stiffness of the damper receptacle 23 may be improved, and thus a load applied by the suspension damper 16 may be distributed through the front inboard wall 21*a* and the rear inboard wall 22*a*.

Referring to FIG. 2, each side portion 11 may further include a front flange 28*a* formed on a front portion of the front inboard wall 21*a*, and the front flange 28*a* may extend horizontally from the front inboard wall 21*a*. Each side portion 11 may include an outboard flange 26 extending along an outboard edge of the front top wall 21, the outboard edge of the top wall 23*a* of the damper receptacle 23, and an outboard edge of the rear top wall 22. Each wheel house inner panel 7 may be fixed to the outboard flange 26 of the corresponding side portion 11, and a wheel house reinforcing member 8 may be fixed to a middle portion of the wheel house inner panel 7 using fasteners, welding, and/or the like. The wheel house reinforcing member 8 may have a channel shape bent along a top surface and an inboard surface of the wheel house inner panel 7. The wheel house reinforcing member 8 may include a front wall facing the front of the vehicle, a rear wall facing the rear of the vehicle, and an inboard wall facing the interior of the vehicle.

Referring to FIGS. 1 and 2, each side portion 11 may further include a channel portion 27 protruding upward from the front top wall 21 and the damper receptacle 23. A portion of the wheel house inner panel 7 and a bottom end of the wheel house reinforcing member 8 may be fixed to the channel portion 27 using fasteners, welding, and/or the like.

Figure 3:
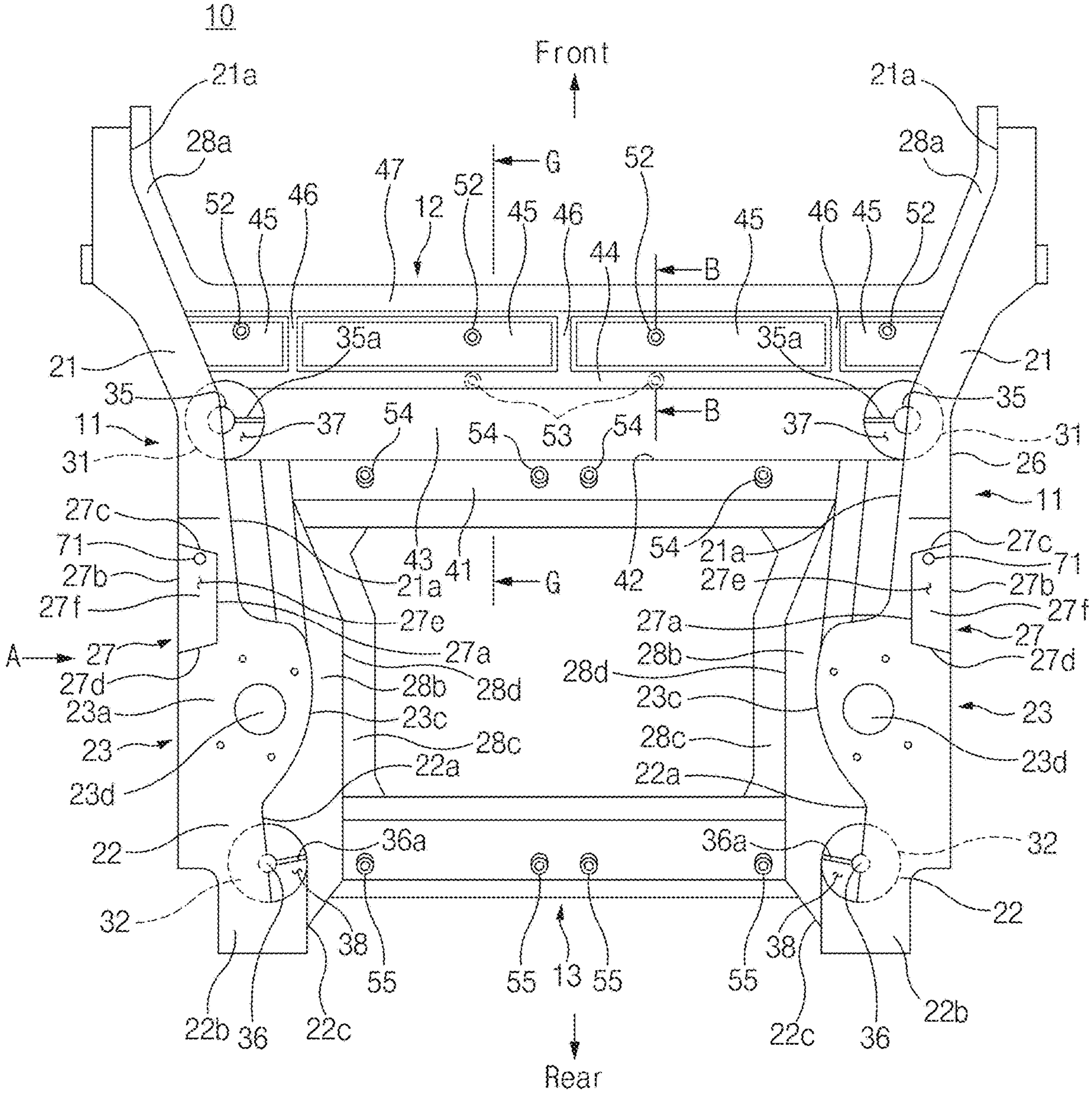
FIG. 3 illustrates a plan view of a rear frame for a vehicle according to an exemplary embodiment of the present disclosure.
Figure 5:
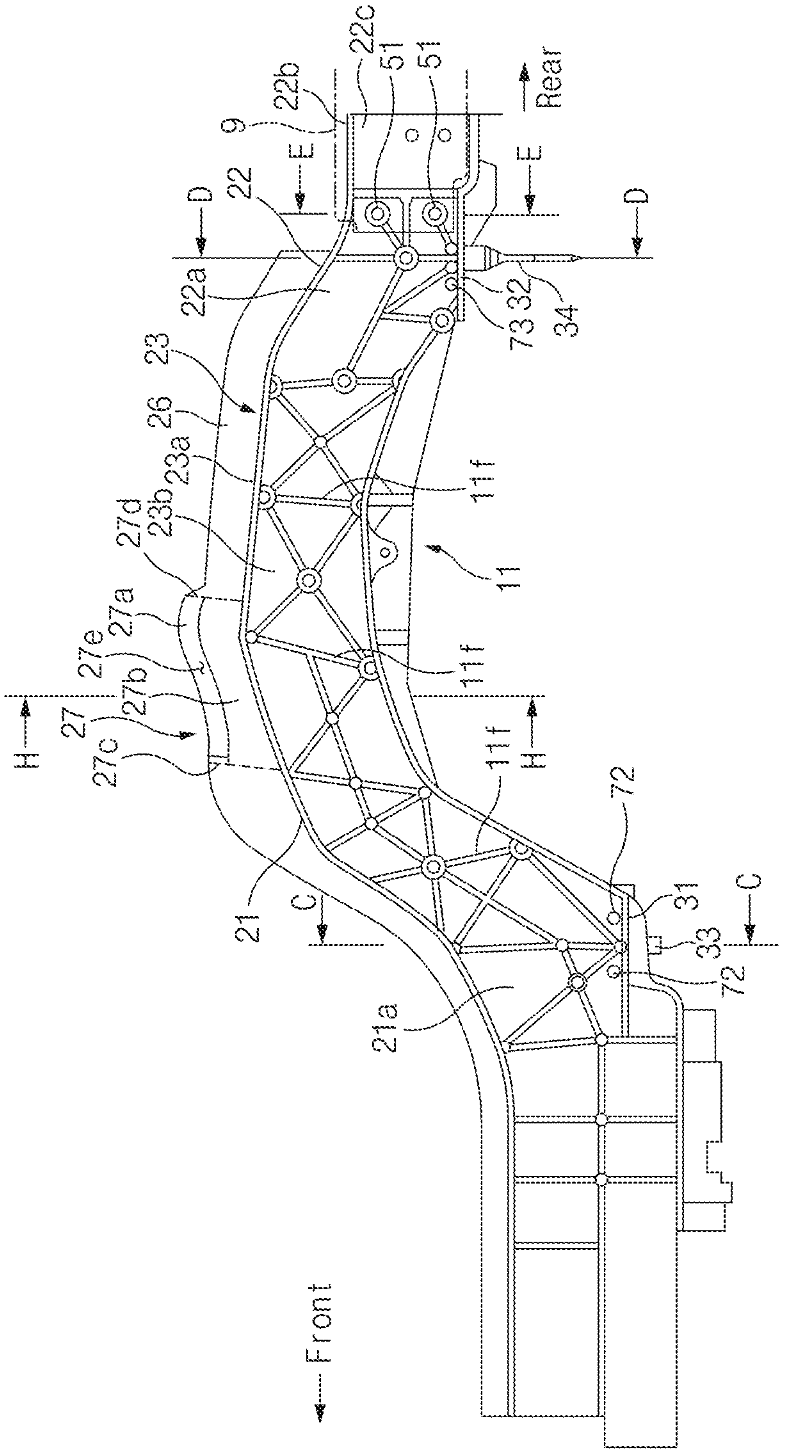
FIG. 5 illustrates a side view of the rear frame which is viewed in a direction of arrow A illustrated in FIG. 3.

Referring to FIGS. 3 and 5, the channel portion 27 may have a pocket shape having a cavity 27*e* with an open top. The channel portion 27 may include an inboard wall 27*a* facing the interior of the vehicle, an outboard wall 27*b* facing the exterior of the vehicle, a front wall 27*c* facing the front of the vehicle, a rear wall 27*d* facing the rear of the vehicle, and a bottom wall 27*f* facing the bottom of the vehicle. The cavity 27*e* may be defined by the inboard wall 27*a*, the outboard wall 27*b*, the front wall 27*c*, the rear wall 27*d*, and the bottom wall 27*f*. The bottom end of the wheel house reinforcing member 8 may be fixed to the inboard wall 27*a*, the front wall 27*c*, and the rear wall 27*d* of the channel portion 27 using fasteners, welding, and/or the like. A portion of the wheel house inner panel 7 may be fixed to the outboard wall 27*b* of the channel portion 27 using fasteners, welding, and/or the like.

Figure 15:
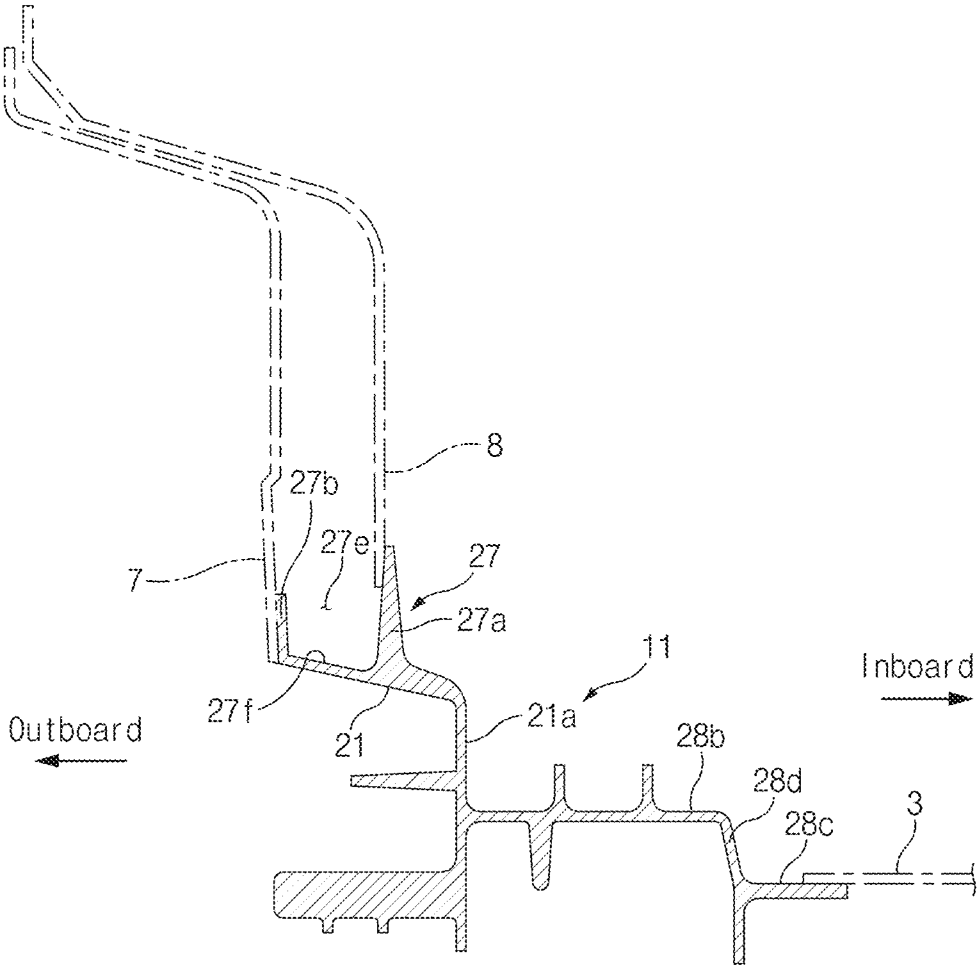
FIG. 15 illustrates a cross-sectional view taken along line H-H of FIG. 5.

Referring to FIG. 15, the bottom end of the wheel house reinforcing member 8 may be fixed to the inboard wall 27*a* of the channel portion 27 using fasteners such as flow drill screw (FDS), and a portion of the wheel house inner panel 7 may be fixed to the outboard wall 27*b* of the channel portion 27 using fasteners such as FDS.

Since the channel portion 27 has a pocket shape with an open top, an electrodeposition coating solution may be stagnated in the cavity 27*e* of the channel portion 27 during electrodeposition coating of the rear frame 10, and the electrodeposition coating solution remaining in the cavity 27*e* of the channel portion 27 may be burned during baking in the electrodeposition coating process. To solve this problem, the channel portion 27 may have a through hole 71 formed in the bottom wall 27*f*, and the through hole 71 may be open to the outside of the channel portion 27. The electrodeposition coating solution may be discharged through the through hole 71 of the channel portion 27 so that the electrodeposition coating solution may not remain in the cavity 27*e* of the channel portion 27.

Each side portion 11 may further include a first inboard horizontal wall 28*b* extending horizontally from the front inboard wall 21*a*, the inboard wall 23*c* of the damper receptacle 23, and the rear inboard wall 22*a* toward the interior of the vehicle, an inboard vertical wall 28*d* extending vertically downward from the first inboard horizontal wall 28*b*, and a second inboard horizontal wall 28*c* extending horizontally from the inboard vertical wall 28*d*.

The first cross portion 12 may be configured to connect the front portions of the pair of side portions 11 in the width direction of the vehicle. The front edge of the first cross portion 12 may be fixed to the rear edge of the first rear floor panel 2, and a rear edge of the first cross portion 12 may be fixed to the front edge of the second rear floor panel 3.

Referring to FIG. 2, the first cross portion 12 may include a top wall 41, a vertical wall 42 extending vertically downward from a front edge of the top wall 41, and a bottom wall 43 extending from a bottom edge of the vertical wall 42 toward the front of the vehicle. A height of the top wall 41 may be the same as or similar to a height of the second cross portion 13. Stiffness of the first cross portion 12 may be improved by the top wall 41, the vertical wall 42, and the bottom wall 43.

Figure 6:
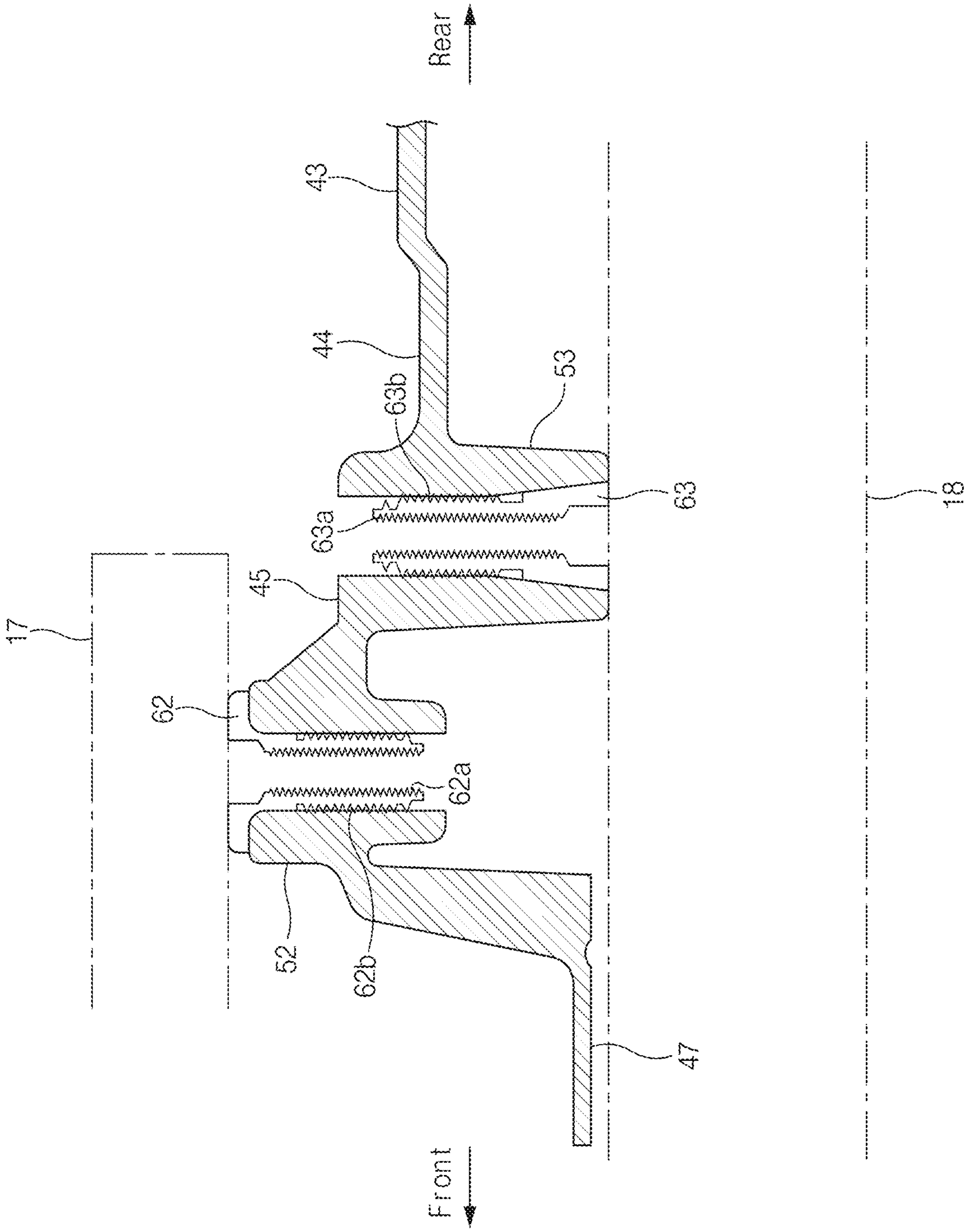
FIG. 6 illustrates a cross-sectional view taken along line B-B of FIG. 3.

Referring to FIGS. 2 and 6, the first cross portion 12 may include a recessed wall 44 which is recessed from the bottom wall 43 toward the bottom of the vehicle, a plurality of raised walls 45 which are raised upward from the recessed wall 44, and a front flange 47 which is recessed downward from a front edge of the recessed wall 44.

Figure 14:
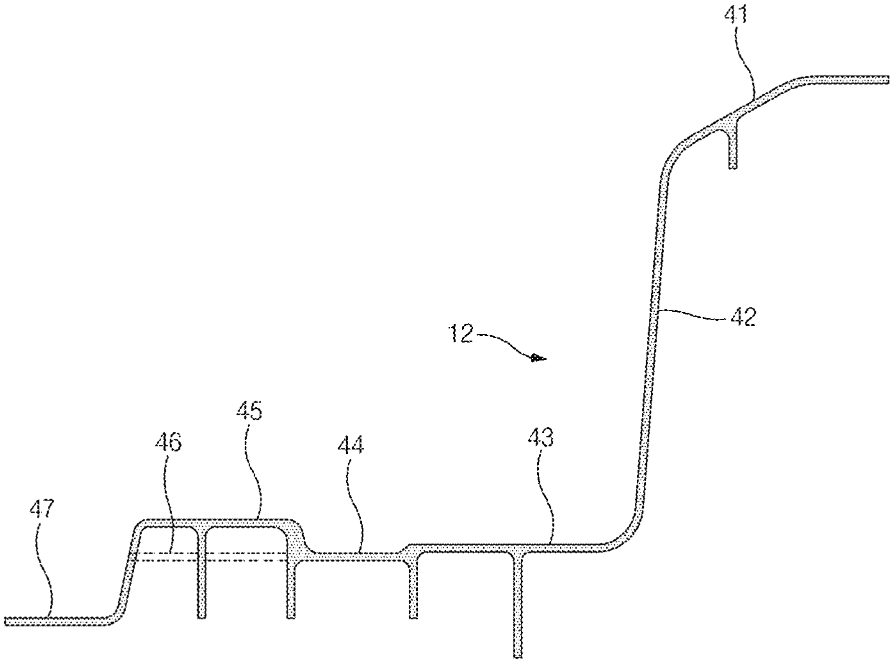
FIG. 14 illustrates a cross-sectional view taken along line G-G of FIG. 3.

Referring to FIGS. 2 and 14, the plurality of raised walls 45 may be adjacent to the front edge of the recessed wall 44, and the plurality of raised walls 45 may be spaced apart from each other in the width direction of the vehicle (that is, in a longitudinal direction of the first cross portion 12) so that a plurality of passages 46 may be formed between the plurality of raised walls 45, and a top surface of each passage 46 may be flush with a top surface of the recessed wall 44. When the electrodeposition coating solution flows down to the recessed wall 44 during the electrodeposition coating of the rear frame 10, the electrodeposition coating solution may move to the front flange 47 through the plurality of passages 46, and accordingly the electrodeposition coating solution may not be stagnated in the recessed wall 44.

The rear edge of the first rear floor panel 2 may be fixed to the front flange 47 of the first cross portion 12 and the front flange 28*a* of the side portion 11 using fasteners, welding, and/or the like.

Referring to FIGS. 4 and 5, each side portion 11 may include a front mounting surface 31 provided on a bottom surface of the front portion thereof and a rear mounting surface 32 provided on a bottom surface of the rear portion thereof. A rear subframe 15 may include a pair of front mounts 15*a* and a pair of rear mounts 15*b*. Each front mount 15*a* of the rear subframe 15 may be mounted on the corresponding front mounting surface 31, and each rear mount 15*b* of the rear subframe 15 may be mounted on the corresponding rear mounting surface 32. The damper receptacle 23 may be located between the front mounting surface 31 and the rear mounting surface 32.

The front mounting surface 31 may be integrally formed with a portion of the front inboard wall 21*a* at a bottom edge of the front inboard wall 21*a*. Referring to FIGS. 3 and 4, the front mounting surface 31 may have a substantially circular shape, and the front inboard wall 21*a* may extend through a center line of the front mounting surface 31 or a line adjacent thereto. The front mounting surface 31 may be integrally connected to the front inboard wall 21*a*.

Referring to FIG. 7, the front mounting surface 31 may be horizontally flat at a bottom edge of a bottom surface of the front inboard wall 21*a*. Each side portion 11 may include a front mounting boss 35 located at the center of the front mounting surface 31. The center line of the front mounting surface 31 may be aligned with the center line of the corresponding side portion 11, and accordingly the front mounting boss 35 may be aligned with the center line of the front mounting surface 31 and the center line of the corresponding side portion 11. The front mounting boss 35 may be formed on a front lower portion of the front inboard wall 21*a*, and the front mounting boss 35 may extend vertically along the front inboard wall 21*a*. Front mounting hardware 33 may be fixed to the front mounting boss 35, and the center of the front mounting hardware 33 may be aligned with the center of the front mounting boss 35. The front mounting hardware 33 may have a nut shape. Referring to FIG. 10, the front mount 15*a* of the rear subframe 15 may be mounted on the front mounting surface 31 through the front mounting hardware 33.

According to the related art, each rear side member may have a front mounting boss formed on a front portion thereof, and each front mount of a rear subframe may be mounted on the corresponding front mounting boss. As the front mounting boss is formed on a front lower portion of an inboard wall of the rear side member, and the inboard wall of the rear side member is adjacent to an inboard edge of the rear side member, the front mounting boss may be formed to have a relatively large thickness, which may degrade castability of the rear side member and cause the formation of a plurality of pores in the front mounting boss, resulting in reduced casting quality. On the other hand, according to an exemplary embodiment of the present disclosure, the front inboard wall 21*a* may extend along the center line between the outboard edge of the side portion 11 and the inboard edge of the side portion 11 so that the thickness of the front mounting boss 35 formed on the front lower portion of the front inboard wall 21*a* may be relatively reduced. Accordingly, castability of the side portion 11 may be improved, and pores may not be formed in the front mounting boss 35, resulting in improved casting quality.

Figure 12:
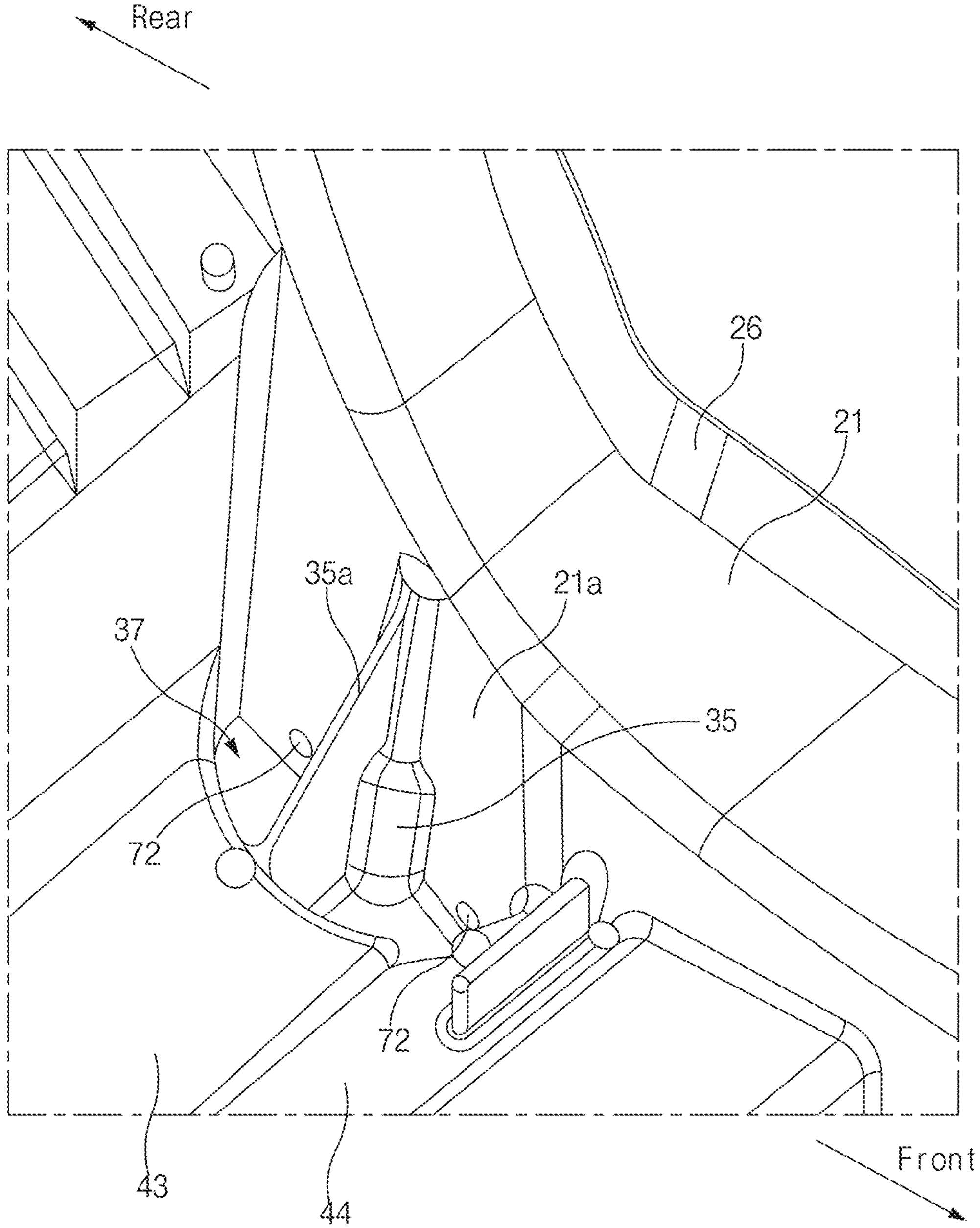
FIG. 12 illustrates a perspective view of a front recessed structure of a rear frame for a vehicle according to an exemplary embodiment of the present disclosure.

Referring to FIG. 7, each side portion 11 may include a front recessed structure 37 formed on the front mounting surface 31. As the front recessed structure 37 is formed on the front mounting surface 31, castability of the side portion 11 may be improved. As the front mounting surface 31 is formed at the bottom edge of the front inboard wall 21*a*, the front recessed structure 37 may be recessed downward between the front inboard wall 21*a* and the first cross portion 12. Accordingly, the front recessed structure 37 may be defined by the front inboard wall 21*a*, the bottom wall 43 of the first cross portion 12, and the front mounting surface 31, and the front recessed structure 37 may have a pocket shape with an open top. Referring to FIG. 12, the front recessed structure 37 may have a substantially semicircular pocket shape facing the front inboard wall 21*a*. The front recessed structure 37 may have a front reinforcing rib 35*a* extending from the front inboard wall 21*a* toward the interior of the vehicle. The front reinforcing rib 35*a* may extend from the front mounting boss 35 of the front inboard wall 21*a* toward the bottom wall 43 of the first cross portion 12 so that the front reinforcing rib 35*a* may extend through the front recessed structure 37. The front reinforcing rib 35*a* may extend in the width direction of the vehicle, and the front reinforcing rib 35*a* may be perpendicular to the front inboard wall 21*a*. Accordingly, stiffness of the front recessed structure 37 may be improved by the front reinforcing rib 35*a*.

Since the front recessed structure 37 has a pocket shape with an open top, the electrodeposition coating solution may be stagnated in the inside of the front recessed structure 37 during the electrodeposition coating of the rear frame 10, and the electrodeposition coating solution remaining in the front recessed structure 37 may be burned during baking in the electrodeposition coating process. To solve this problem, a through hole 72 may be formed in a portion of the front inboard wall 21*a* defining the front recessed structure 37, and the through hole 72 may be open to the outside of the front recessed structure 37. According to an exemplary embodiment, the through hole 72 may extend obliquely from the front inboard wall 21*a* toward the exterior of the vehicle, and the through hole 72 may directly communicate with the front recessed structure 37. Accordingly, the electrodeposition coating solution received in the front recessed structure 37 may be discharged through the through hole 72 of the front recessed structure 37 so that the electrodeposition coating solution may not remain in the front recessed structure 37.

The rear mounting surface 32 may be integrally formed with a portion of the rear inboard wall 22*a* at a bottom edge of the rear inboard wall 22*a*. Referring to FIGS. 3 and 4, the rear mounting surface 32 may have a substantially circular shape, and the rear inboard wall 22*a* may extend through a center line of the rear mounting surface 32 or a line adjacent thereto. The rear mounting surface 32 may be integrally connected to the rear inboard wall 22*a*.

Referring to FIG. 8, the rear mounting surface 32 may be horizontally flat at a bottom edge of a bottom surface of the rear inboard wall 22*a*. Each side portion 11 may include a rear mounting boss 36 located at the center of the rear mounting surface 32. The center line of the rear mounting surface 32 may be aligned with the center line of the corresponding side portion 11, and accordingly the rear mounting boss 36 may be aligned with the center line of the side portion 11 and the center line of the corresponding rear mounting surface 32. The rear mounting boss 36 may be formed on a rear lower portion of the rear inboard wall 22*a*, and the rear mounting boss 36 may extend vertically along the rear inboard wall 22*a*. Rear mounting hardware 34 may be fixed to the rear mounting boss 36, and the center of the rear mounting hardware 34 may be aligned with the center of the rear mounting boss 36. The rear mounting hardware 34 may have a bolt shape. Referring to FIG. 10, the rear mount 15*b* of the rear subframe 15 may be mounted on the rear mounting surface 32 through the rear mounting hardware 34.

According to the related art, each rear side member may have a rear mounting boss formed on a rear portion thereof, and each rear mount of the rear subframe may be mounted on the corresponding rear mounting boss. As the rear mounting boss is formed on a rear lower portion of the inboard wall of the rear side member, and the inboard wall of the rear side member is adjacent to the inboard edge of the rear side member, the rear mounting boss may be formed to have a relatively large thickness, which may degrade castability of the rear side member and cause the formation of a plurality of pores in the rear mounting boss, resulting in reduced casting quality. On the other hand, according to an exemplary embodiment of the present disclosure, the rear inboard wall 22*a* may extend along the center line between the outboard edge of the side portion 11 and the inboard edge of the side portion 11 so that the thickness of the rear mounting boss 36 formed on the rear lower portion of the rear inboard wall 22*a* may be relatively reduced. Accordingly, castability of the side portion 11 may be improved, and pores may not be formed in the rear mounting boss 36, resulting in improved casting quality.

Figure 13:
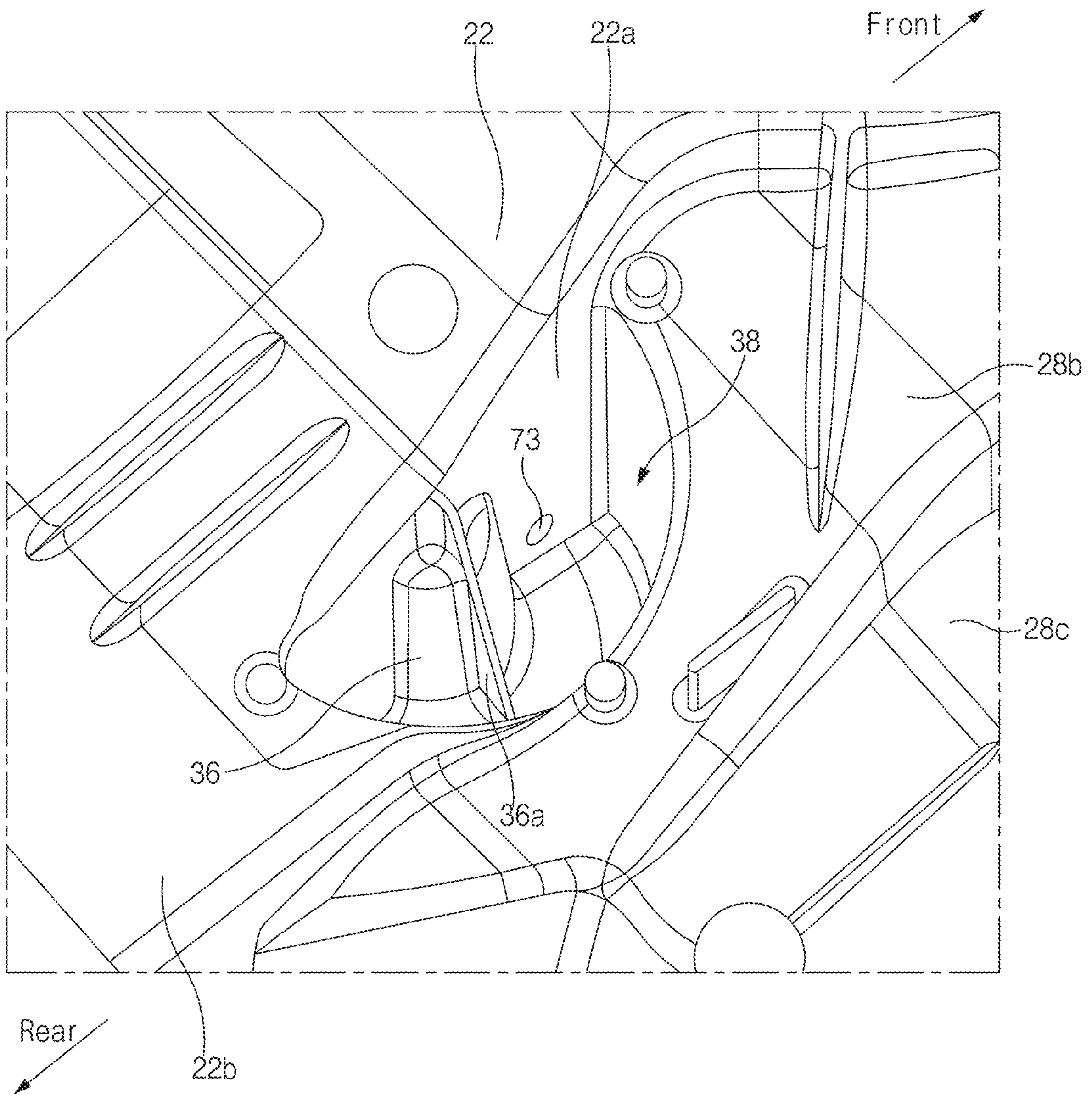
FIG. 13 illustrates a perspective view of a rear recessed structure of a rear frame for a vehicle according to an exemplary embodiment of the present disclosure.

Referring to FIG. 8, each side portion 11 may include a rear recessed structure 38 formed on the rear mounting surface 32. As the rear recessed structure 38 is formed on the rear mounting surface 32, castability of the side portion 11 may be improved. As the rear mounting surface 32 is formed at the bottom edge of the rear inboard wall 22*a*, the rear recessed structure 38 may be recessed downward between the rear inboard wall 22*a* and the first inboard horizontal wall 28*b*. Accordingly, the rear recessed structure 38 may be defined by the rear inboard wall 22*a*, the first inboard horizontal wall 28*b* of the side portion 11, and the rear mounting surface 32, and the rear recessed structure 38 may have a pocket shape with an open top. Referring to FIG. 13, the rear recessed structure 38 may have a substantially semicircular pocket shape facing the rear inboard wall 22*a*. The rear recessed structure 38 may have a rear reinforcing rib 36*a* extending from the rear inboard wall 22*a* toward the interior of the vehicle. The rear reinforcing rib 36*a* may extend from the rear mounting boss 36 of the rear inboard wall 22*a* toward the first inboard horizontal wall 28*b* of the side portion 11 so that the rear reinforcing rib 36*a* may extend through the rear recessed structure 38. The rear reinforcing rib 36*a* may extend in the width direction of the vehicle, and the rear reinforcing rib 36*a* may be perpendicular to the rear inboard wall 22*a*. Accordingly, stiffness of the rear recessed structure 38 may be improved by the rear reinforcing rib 36*a*.

Since the rear recessed structure 38 has a pocket shape with an open top, the electrodeposition coating solution may be stagnated in the inside of the rear recessed structure 38 during the electrodeposition coating of the rear frame 10, and the electrodeposition coating solution remaining in the rear recessed structure 38 may be burned during baking in the electrodeposition coating process. To solve this problem, a through hole 73 may be formed in a portion of the rear inboard wall 22*a* defining the rear recessed structure 38, and the through hole 73 may be open to the outside of the rear recessed structure 38. According to an exemplary embodiment, the through hole 73 may extend obliquely from the rear inboard wall 22*a* toward the exterior of the vehicle, and the through hole 73 may directly communicate with the rear recessed structure 38. Accordingly, the electrodeposition coating solution received in the rear recessed structure 38 may be discharged through the through hole 73 so that the electrodeposition coating solution may not remain in the rear recessed structure 38.

As described above, the front inboard walls 21*a* may be integrally connected to the corresponding front mounting surfaces 31, the rear inboard walls 22*a* may be integrally connected to the corresponding rear mounting surfaces 32, the front mounts 15*a* of the rear subframe 15 may be mounted on the corresponding front mounting surfaces 31, and the rear mounts 15*b* of the rear subframe 15 may be mounted on the corresponding rear mounting surfaces 32 so that the rear subframe 15 mounted on the pair of side portions 11 may be stably supported by the front inboard walls 21*a* and the rear inboard walls 22*a* along the longitudinal direction of the vehicle.

Figure 9:
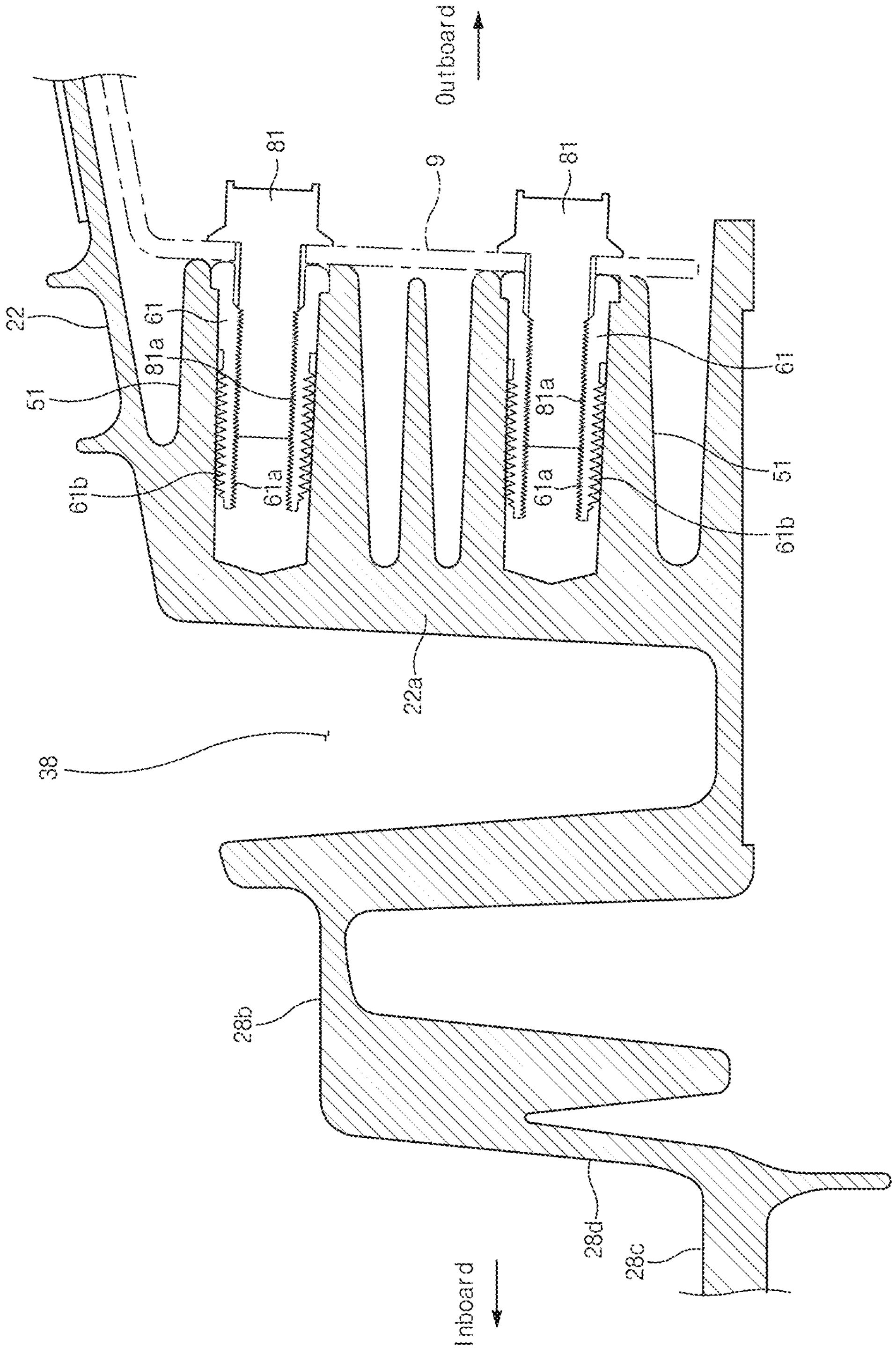
FIG. 9 illustrates a cross-sectional view taken along line E-E of FIG. 5.

The rear end of each side portion 11 may be connected to the corresponding rear extension member 9. The rear inboard wall 22*a* of each side portion 11 may be fixed to the rear extension member 9. Referring to FIGS. 5 and 9, the rear inboard wall 22*a* may include a plurality of rear extension member mounting bosses 51 provided on a rear portion thereof, and each rear extension member mounting boss 51 may have a mounting hole defined therein. The front portion of the rear extension member 9 may be fixed to the rear extension member mounting boss 51 of the rear inboard wall 22*a* through a bolt 81. Mounting hardware such as a tapping nut 61 may be mounted in the mounting hole of the corresponding rear extension member mounting boss 51. The tapping nut 61 may have internal threads 61*a* formed on an inner surface thereof and external threads 61*b* formed on an outer surface thereof. The rear extension member mounting boss 51 may be tapped by the external threads 61*b* of the tapping nut 61 so that the tapping nut 61 may be mounted in the rear extension member mounting boss 51, and external threads 81*a* of the bolt 81 may be engaged with the internal threads 61*a* of the tapping nut 61 so that the front portion of the rear extension member 9 may be mounted on the rear extension member mounting boss 51 of the rear inboard wall 22*a*.

Referring to FIG. 3, the first cross portion 12 may include a plurality of seat-side mounting bosses 52 adjacent to the front edge thereof. The plurality of seat-side mounting bosses 52 may be spaced apart from each other in the width direction of the vehicle. Each seat-side mounting boss 52 may have a mounting hole defined therein. Referring to FIG. 6, the seat-side mounting boss 52 may protrude upward from the raised wall 45 of the first cross portion 12, and a rear seat mount 17 for a rear vehicle seat (for example, a second-row vehicle seat) may be mounted on the seat-side mounting boss 52 through a bolt. Mounting hardware such as a tapping nut 62 may be mounted in the mounting hole of the corresponding seat-side mounting boss 52. The tapping nut 62 may have internal threads 62*a* formed on an inner surface thereof and external threads 62*b* formed on an outer surface thereof. The seat-side mounting boss 52 may be tapped by the external threads 62*b* of the tapping nut 62 so that the tapping nut 62 may be mounted in the seat-side mounting boss 52, and external threads of the bolt may be engaged with the internal threads 62*a* of the tapping nut 62 so that the rear seat mount 17 may be mounted on the seat-side mounting boss 52 of the first cross portion 12. The plurality of seat-side mounting bosses 52 may be disposed symmetrically with respect to the center of the first cross portion 12.

Referring to FIG. 3, the first cross portion 12 may include a plurality of battery-side mounting bosses 53 adjacent to the plurality of seat-side mounting bosses 52. The plurality of battery-side mounting bosses 53 may be spaced apart from each other in the width direction of the vehicle. Each battery-side mounting boss 53 may have a mounting hole defined therein. Referring to FIG. 6, the battery-side mounting boss 53 may be located behind the seat-side mounting boss 52, the battery-side mounting boss 53 may protrude downward from the raised wall 45 of the first cross portion 12, and a battery 18 may be mounted on the battery-side mounting boss 53 through a bolt. Mounting hardware such as a tapping nut 63 may be mounted in the mounting hole of the corresponding battery-side mounting boss 53. The tapping nut 63 may have internal threads 63*a* formed on an inner surface thereof and external threads 63*b* formed on an outer surface thereof. The battery-side mounting boss 53 may be tapped by the external threads 63*b* of the tapping nut 63 so that the tapping nut 63 may be mounted in the battery-side mounting boss 53, and external threads of the bolt may be engaged with the internal threads 63*a* of the tapping nut 63 so that the battery 18 may be mounted on the battery-side mounting boss 53 of the first cross portion 12. The plurality of battery-side mounting bosses 53 may be disposed symmetrically with respect to the center of the first cross portion 12.

Referring to FIG. 3, the first cross portion 12 may include a plurality of first mounting bosses 54 adjacent to the rear edge thereof, and each first mounting boss 54 may have a mounting hole defined therein. A front seat mount for a vehicle seat (for example, a third-row vehicle seat) located at the rearmost section of a cabin of the vehicle may be mounted on the first mounting boss 54 of the first cross portion 12 through a bolt.

Referring to FIG. 3, the second cross portion 13 may include a plurality of second mounting bosses 55, and each second mounting boss 55 may have a mounting hole defined therein. A rear seat mount for a vehicle seat (for example, a third-row vehicle seat) located at the rearmost section of the cabin of the vehicle may be mounted on the second mounting boss 55 of the second cross portion 13 through a bolt.

Referring to FIG. 4, each side portion 11 may include a plurality of reinforcing ribs 11*a*, 11*b*, and 11*c* integrally formed on the bottom surface thereof. The plurality of reinforcing ribs 11*a*, 11*b*, and 11*c* may include a first reinforcing rib 11*a* extending in a longitudinal direction of the side portion 11, a plurality of second reinforcing ribs 11*b* extending in a diagonal direction, and a plurality of third reinforcing ribs 11*c* extending in a width direction of the side portion 11. The first reinforcing rib 11*a* may be spaced apart from the front inboard wall 21*a*, the damper receptacle 23, and the rear inboard wall 22*a* toward the interior of the vehicle. The plurality of reinforcing ribs 11*a*, 11*b*, and 11*c* may be arranged to intersect each other in the longitudinal direction of the side portion 11, and the plurality of reinforcing ribs 11*a*, 11*b*, and 11*c* may be integrally connected to the front inboard wall 21*a*, the inboard wall 23*c* of the damper receptacle 23, and the rear inboard wall 22*a*. The plurality of second reinforcing ribs 11*b* may connect the damper receptacle 23 to the first reinforcing rib 11*a*, and the plurality of third reinforcing ribs 11*c* may connect the front inboard wall 21*a* and the rear inboard wall 22*a* to the first reinforcing rib 11*a*. Accordingly, stiffness of the side portion 11 and the damper receptacle 23 may be improved by the plurality of reinforcing ribs 11*a*, 11*b*, and 11*c*.

Referring to FIG. 5, each side portion 11 may include a plurality of reinforcing ribs 11*f* integrally formed with the front inboard wall 21*a*, the inboard wall 23*c* of the damper receptacle 23, and the rear inboard wall 22*a*, and the plurality of reinforcing ribs 11*f* may intersect and be connected to each other in the longitudinal direction of the side portion 11. Accordingly, lateral stiffness of the side portion 11 may be improved by the plurality of reinforcing ribs 11*f*.

Referring to FIG. 4, the first cross portion 12 may include a plurality of reinforcing ribs 12*a*, 12*b*, and 12*c* integrally formed on a bottom surface thereof. The plurality of reinforcing ribs 12*a*, 12*b*, and 12*c* may include a plurality of first reinforcing ribs 12*a* extending in the width direction of the vehicle, a plurality of second reinforcing ribs 12*b* extending in the longitudinal direction of the vehicle, and a plurality of third reinforcing ribs 12*c* extending in a diagonal direction. The plurality of reinforcing ribs 12*a*, 12*b*, and 12*c* may be arranged to intersect each other in the width direction of the vehicle, and accordingly stiffness of the first cross portion 12 may be improved by the plurality of reinforcing ribs 12*a*, 12*b*, and 12*c*. Some of the reinforcing ribs 12*a*, 12*b*, and 12*c* may be connected to the plurality of battery-side mounting bosses 53. For example, the first reinforcing rib 12*a*, the second reinforcing rib 12*b*, and the third reinforcing rib 12*c* may be connected to each battery-side mounting boss 53 while intersecting each other so that stiffness of the plurality of battery-side mounting bosses 53 may be improved.

Referring to FIG. 4, the first cross portion 12 may include a plurality of reinforcing ribs 54*a*, 54*b*, and 54*c* integrally connected to the first mounting bosses 54. The plurality of reinforcing ribs 54*a*, 54*b*, and 54*c* may include a plurality of first reinforcing ribs 54*a* extending in the width direction of the vehicle, a plurality of second reinforcing ribs 54*b* extending in a diagonal direction, and a plurality of third reinforcing ribs 54*c* extending in the longitudinal direction of the vehicle. For example, the first reinforcing rib 54*a* may be connected to the first mounting bosses 54 adjacent to a center line of the rear frame 10. The first reinforcing rib 54*a*, the second reinforcing rib 54*b*, and the third reinforcing rib 54*c* may be connected to the first mounting boss 54 adjacent to each end of the first cross portion 12 while intersecting each other.

Referring to FIG. 4, the second cross portion 13 may include a plurality of reinforcing ribs 13*a* and 13*b* integrally formed on a bottom surface thereof. The plurality of reinforcing ribs 13*a* and 13*b* may include a plurality of first reinforcing ribs 13*a* extending in the width direction of the vehicle, and a plurality of second reinforcing ribs 13*b* extending in a diagonal direction. The plurality of reinforcing ribs 13*a* and 13*b* may be arranged to intersect each other in the width direction of the vehicle, and stiffness of the second cross portion 13 may be improved by the plurality of reinforcing ribs 13*a* and 13*b*.

Referring to FIG. 4, the second cross portion 13 may include a plurality of reinforcing ribs 55*a*, 55*b*, and 55*c* integrally connected to the second mounting bosses 55. The plurality of reinforcing ribs 55*a*, 55*b*, and 55*c* may include a plurality of first reinforcing ribs 55*a* extending in the longitudinal direction of the vehicle, a plurality of second reinforcing ribs 55*b* extending in a diagonal direction, and a plurality of third reinforcing ribs 55*c* extending in the width direction of the vehicle. For example, the first reinforcing rib 55*a*, the second reinforcing rib 55*b*, and the third reinforcing rib 55*c* may be connected to the second mounting boss 55 of the second cross portion 13 while intersecting each other.

As set forth above, the rear frame according to exemplary embodiments of the present disclosure may be designed to have the plurality of pocket structures with the open top or open bottom so that it may be easily manufactured by the casting method. By preventing the stagnation of the electrodeposition coating solution, the quality of the electrodeposition coating may be improved. The reinforcing ribs may be connected to the pocket structures to thereby increase stiffness, resulting in improved NVH and R&H performance.

According to exemplary embodiments of the present disclosure, the pair of side portions and the plurality of cross portions may form a unitary one-piece structure by the casting method so that stiffness of the vehicle rear structure may be improved. In particular, as the pair of side portions and the plurality of cross portions form a unitary one-piece structure, there may be no joints made by welding, fasteners, brackets, reinforcements, etc. Accordingly, the load may be uniformly distributed or transferred through the pair of side portions and the plurality of cross portions. According to the related art, as fractures or damage occur at the joints between the rear side members and the crossmembers, stiffness of the rear frame may be reduced. On the other hand, as the rear frame according to exemplary embodiments of the present disclosure has no joints between each side portion and the cross portions, a decrease in stiffness at the joints of the rear frame may be prevented. Not only the mounting stiffness of related components connected to the rear frame and stiffness thereof at mounting points but also rear crashworthiness (strength to withstand a rear crash or impact) may be significantly improved.

Hereinabove, although embodiments of the present disclosure have been described with reference to exemplary embodiments and the accompanying drawings, the present disclosure is not limited thereto, but it may be variously modified and altered by those skilled in the art to which the present disclosure pertains without departing from the spirit and scope of the present disclosure claimed in the following claims.

What is claimed is:

1. A rear frame comprising:

a pair of side portions spaced apart from each other in a width direction of a vehicle, each side portion comprising:

a front mounting surface on which a front mount of a rear subframe is mounted;

a front recessed structure disposed on the front mounting surface, the front recessed structure having a pocket shape with an open top and a first through hole;

a rear mounting surface on which a rear mount of the rear subframe is mounted; and a rear recessed structure disposed on the rear mounting surface, the rear recessed structure having the pocket shape with the open top and a second through hole;

a first cross portion connecting front portions of the pair of side portions; and a second cross portion connecting rear portions of the pair of side portions, wherein the pair of side portions, the first cross portion, and the second cross portion together are a unitary one-piece structure.

2. The rear frame according to claim 1, wherein:

each side portion further comprises a channel portion to which a wheel house inner panel and a wheel house reinforcing member are fixed;

the channel portion has the pocket shape with the open top; and the channel portion has a third through hole.

3. The rear frame according to claim 1, wherein:

each side portion further comprises a damper receptacle in which a suspension damper is mounted; and the damper receptacle has the pocket shape having a cavity with an open bottom.

4. The rear frame according to claim 3, wherein the damper receptacle is disposed between the front mounting surface and the rear mounting surface.

5. The rear frame according to claim 3, wherein each side portion further comprises a front inboard wall extending from the damper receptacle toward a front of the vehicle and a rear inboard wall extending from the damper receptacle toward a rear of the vehicle.

6. The rear frame according to claim 5, wherein the front inboard wall and the rear inboard wall extend along a center line between an inboard edge of the respective side portion and an outboard edge of the respective side portion.

7. The rear frame according to claim 6, wherein:

the front mounting surface is disposed at a bottom edge of the front inboard wall; and the rear mounting surface is disposed at a bottom edge of the rear inboard wall.

8. The rear frame according to claim 6, wherein:

the front recessed structure is defined by the front inboard wall and the front mounting surface; and the front recessed structure has a reinforcing rib extending from the front inboard wall toward an interior of the vehicle.

9. The rear frame according to claim 6, wherein:

the rear recessed structure is defined by the rear inboard wall and the rear mounting surface; and the rear recessed structure has a reinforcing rib extending from the rear inboard wall toward an interior of the vehicle.

10. A rear frame comprising:

a pair of side portions spaced apart from each other in a width direction of a vehicle, each side portion comprising:

a front mounting surface on which a front mount of a rear subframe is mounted;

a front recessed structure disposed on the front mounting surface, the front recessed structure having a pocket shape with an open top and a first through hole;

a rear mounting surface on which a rear mount of the rear subframe is mounted; and a rear recessed structure disposed on the rear mounting surface, the rear recessed structure having the pocket shape with the open top and a second through hole;

a first cross portion connecting front portions of the pair of side portions, the first cross portion comprising:

a top wall;

a vertical wall extending vertically downward from the top wall;

a bottom wall extending from a bottom edge of the vertical wall toward a front of the vehicle;

a recessed wall recessed from the bottom wall toward a bottom of the vehicle;

a plurality of raised walls raised upward from the recessed wall; and a plurality of passages disposed between the plurality of raised walls, the plurality of passages being flush with a top surface of the recessed wall; and a second cross portion connecting rear portions of the pair of side portions, wherein the pair of side portions, the first cross portion, and the second cross portion together are a unitary one-piece structure.

11. The rear frame according to claim 10, wherein:

each side portion further comprises a channel portion to which a wheel house inner panel and a wheel house reinforcing member are fixed;

the channel portion has the pocket shape with the open top; and the channel portion has a third through hole.

12. The rear frame according to claim 11, wherein:

each side portion further comprises a damper receptacle in which a suspension damper is mounted; and the damper receptacle has the pocket shape having a cavity with an open bottom.

13. The rear frame according to claim 12, wherein the damper receptacle is disposed between the front mounting surface and the rear mounting surface.

14. The rear frame according to claim 12, wherein each side portion further comprises a front inboard wall extending from the damper receptacle toward the front of the vehicle and a rear inboard wall extending from the damper receptacle toward a rear of the vehicle.

15. The rear frame according to claim 14, wherein the front inboard wall and the rear inboard wall extend along a center line between an inboard edge of the respective side portion and an outboard edge of the respective side portion.

16. The rear frame according to claim 15, wherein:

the front mounting surface is disposed at a bottom edge of the front inboard wall; and the rear mounting surface is disposed at a bottom edge of the rear inboard wall.

17. The rear frame according to claim 15, wherein:

the front recessed structure is defined by the front inboard wall and the front mounting surface; and the front recessed structure has a reinforcing rib extending from the front inboard wall toward an interior of the vehicle.

18. The rear frame according to claim 15, wherein:

the rear recessed structure is defined by the rear inboard wall and the rear mounting surface; and the rear recessed structure has a reinforcing rib extending from the rear inboard wall toward an interior of the vehicle.

19. A rear frame comprising:

a pair of side portions spaced apart from each other in a width direction of a vehicle, each side portion comprising:

a front mounting surface on which a front mount of a rear subframe is mounted;

a front recessed structure disposed on the front mounting surface, the front recessed structure having a pocket shape with an open top and a first through hole;

a rear mounting surface on which a rear mount of the rear subframe is mounted;

a rear recessed structure disposed on the rear mounting surface, the rear recessed structure having the pocket shape with the open top and a second through hole;

a channel portion to which a wheel house inner panel and a wheel house reinforcing member are fixed, the channel portion having the pocket shape with the open top and a third through hole;

a damper receptacle in which a suspension damper is mounted, the damper receptacle having the pocket shape having a cavity with an open bottom;

a front inboard wall extending from the damper receptacle toward a front of the vehicle; and a rear inboard wall extending from the damper receptacle toward a rear of the vehicle;

a first cross portion connecting front portions of the pair of side portions; and a second cross portion connecting rear portions of the pair of side portions, wherein the pair of side portions, the first cross portion, and the second cross portion together are a unitary one-piece structure.

20. The rear frame according to claim 19, wherein:

the front inboard wall and the rear inboard wall extend along a center line between an inboard edge of the respective side portion and an outboard edge of the respective side portion;

the front mounting surface is disposed at a bottom edge of the front inboard wall;

the rear mounting surface is disposed at a bottom edge of the rear inboard wall;

the front recessed structure is defined by the front inboard wall and the front mounting surface;

the front recessed structure has a first reinforcing rib extending from the front inboard wall toward an interior of the vehicle;

the rear recessed structure is defined by the rear inboard wall and the rear mounting surface; and the rear recessed structure has a second reinforcing rib extending from the rear inboard wall toward the interior of the vehicle.

* * * * *